(12) United States Patent
Sandhu et al.

(10) Patent No.: US 6,488,566 B2
(45) Date of Patent: Dec. 3, 2002

(54) SYSTEM FOR REAL-TIME CONTROL OF SEMICONDUCTOR WAFER POLISHING

(75) Inventors: Gurtej S. Sandhu, Boise, ID (US); Trung Tri Doan, Boise, ID (US)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 09/993,010

(22) Filed: Nov. 14, 2001

(65) Prior Publication Data

US 2002/0034922 A1 Mar. 21, 2002

Related U.S. Application Data

(60) Division of application No. 09/838,298, filed on Apr. 18, 2001, which is a division of application No. 09/444,022, filed on Nov. 19, 1999, now Pat. No. 6,306,009, which is a continuation of application No. 09/181,433, filed on Oct. 28, 1998, now Pat. No. 6,120,347, which is a continuation of application No. 08/907,389, filed on Aug. 7, 1997, now Pat. No. 5,851,135, which is a continuation of application No. 08/547,529, filed on Oct. 24, 1995, now Pat. No. 5,700,180, which is a continuation-in-part of application No. 08/112,759, filed on Aug. 25, 1993, now Pat. No. 5,486,129.

(51) Int. Cl.[7] ............................ B24B 1/00; B24B 49/02; B24B 49/12

(52) U.S. Cl. .................. 451/5; 451/7; 451/8; 451/288; 451/289; 451/41

(58) Field of Search ............................... 437/7, 8, 225, 437/249; 451/5, 6, 7, 8, 9, 10, 41, 285, 286, 287, 288, 289, 290

(56) References Cited

U.S. PATENT DOCUMENTS

| 5,618,447 A | * | 4/1997 | Sandhu .......................... 451/5 |
| 5,873,769 A | | 2/1999 | Chiou et al. |
| 5,944,580 A | * | 8/1999 | Kim et al. ..................... 451/10 |
| 6,095,898 A | | 8/2000 | Hennhofer et al. |

* cited by examiner

Primary Examiner—Timothy V. Eley
(74) Attorney, Agent, or Firm—Wells St. John P.S.

(57) ABSTRACT

A system for polishing a semiconductor wafer, the system comprising a wafer polishing assembly for polishing a face of a semiconductor wafer at a polishing rate and a polishing uniformity, the wafer polishing assembly including a platen subassembly defining a polishing area, and a polishing head selectively supporting a semiconductor wafer and holding a face of the semiconductor wafer in contact with the platen subassembly to polish the wafer face; and a controller selectively adjusting one of a plurality of adjustable polishing parameters during polishing of the wafer.

20 Claims, 15 Drawing Sheets

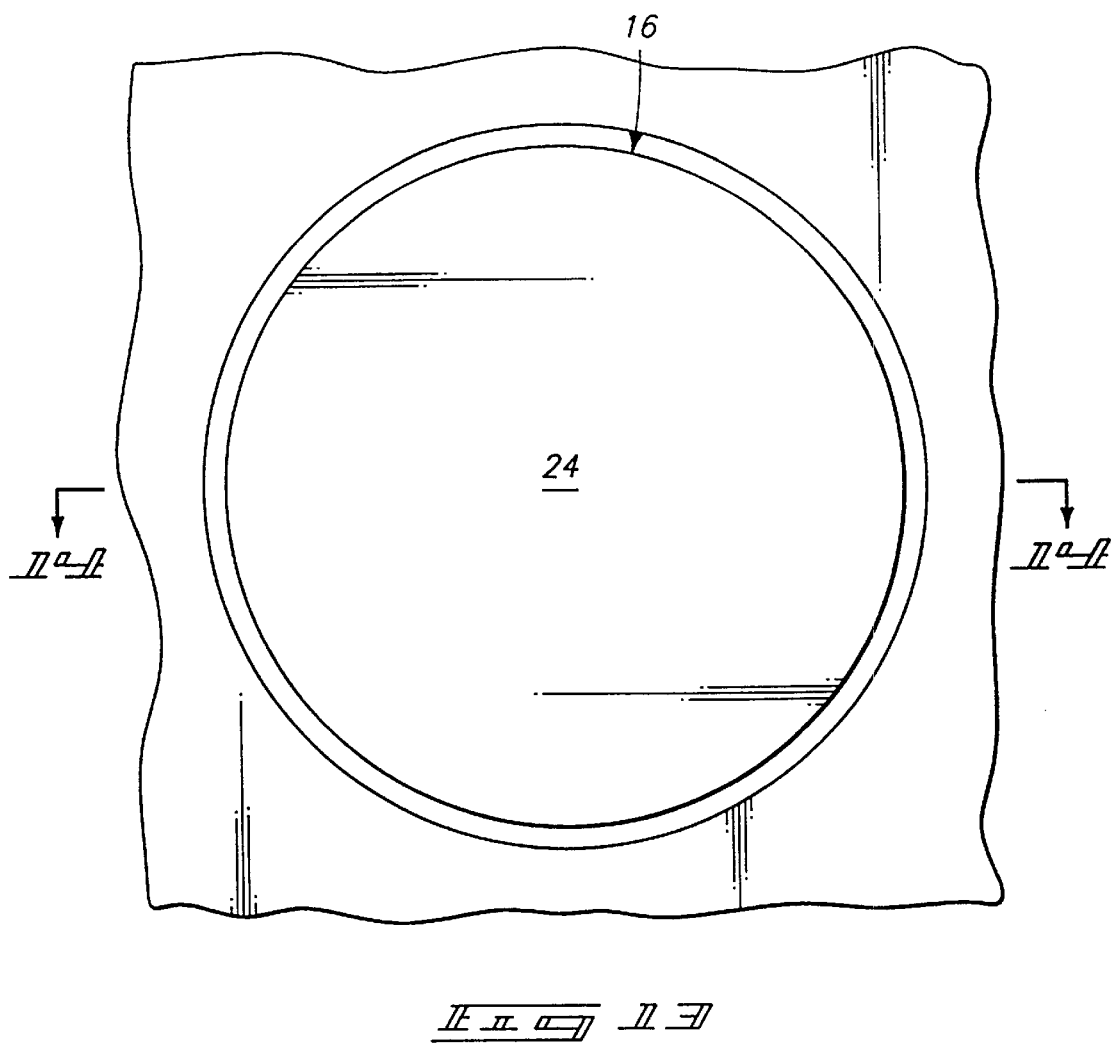

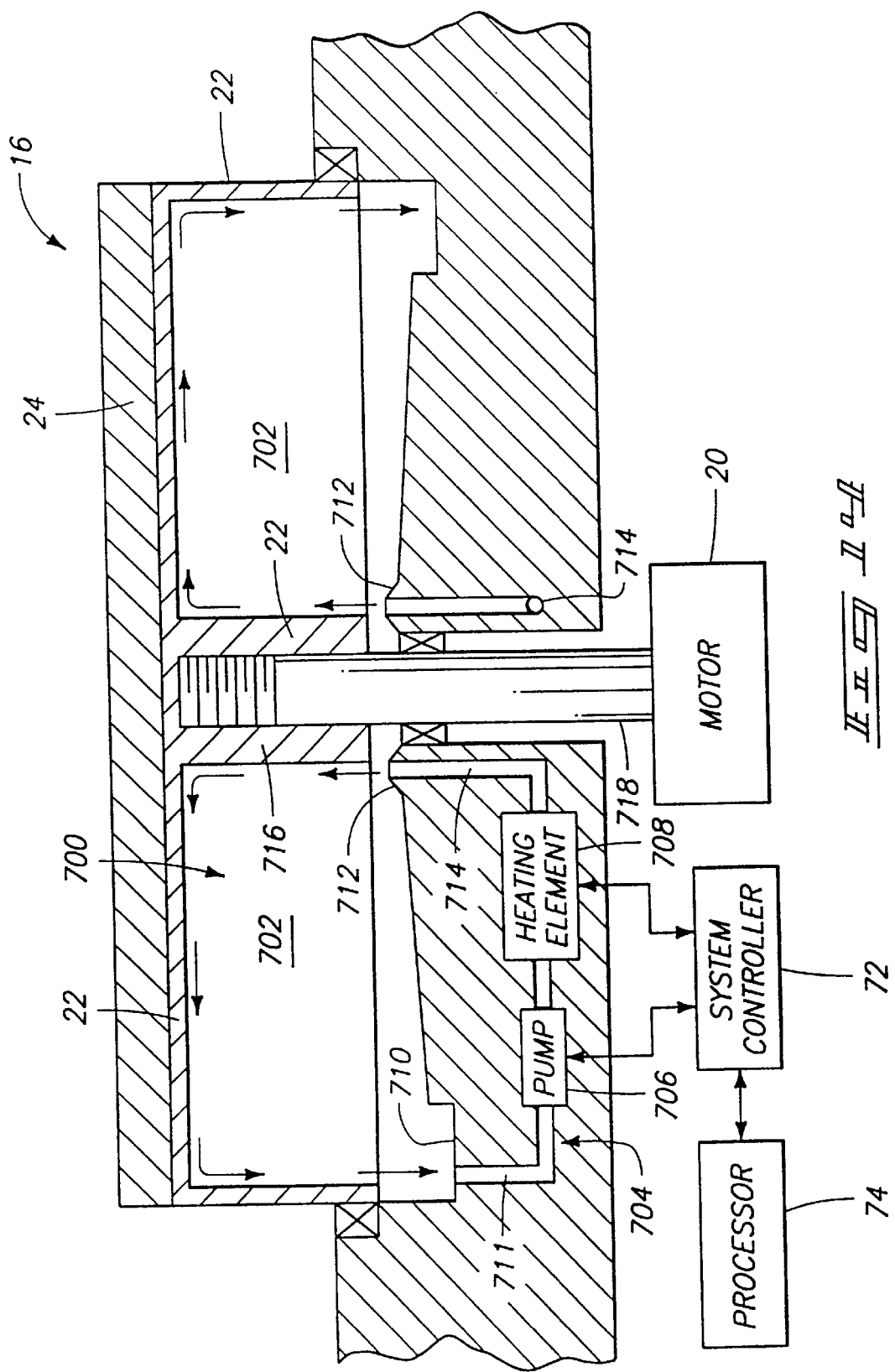

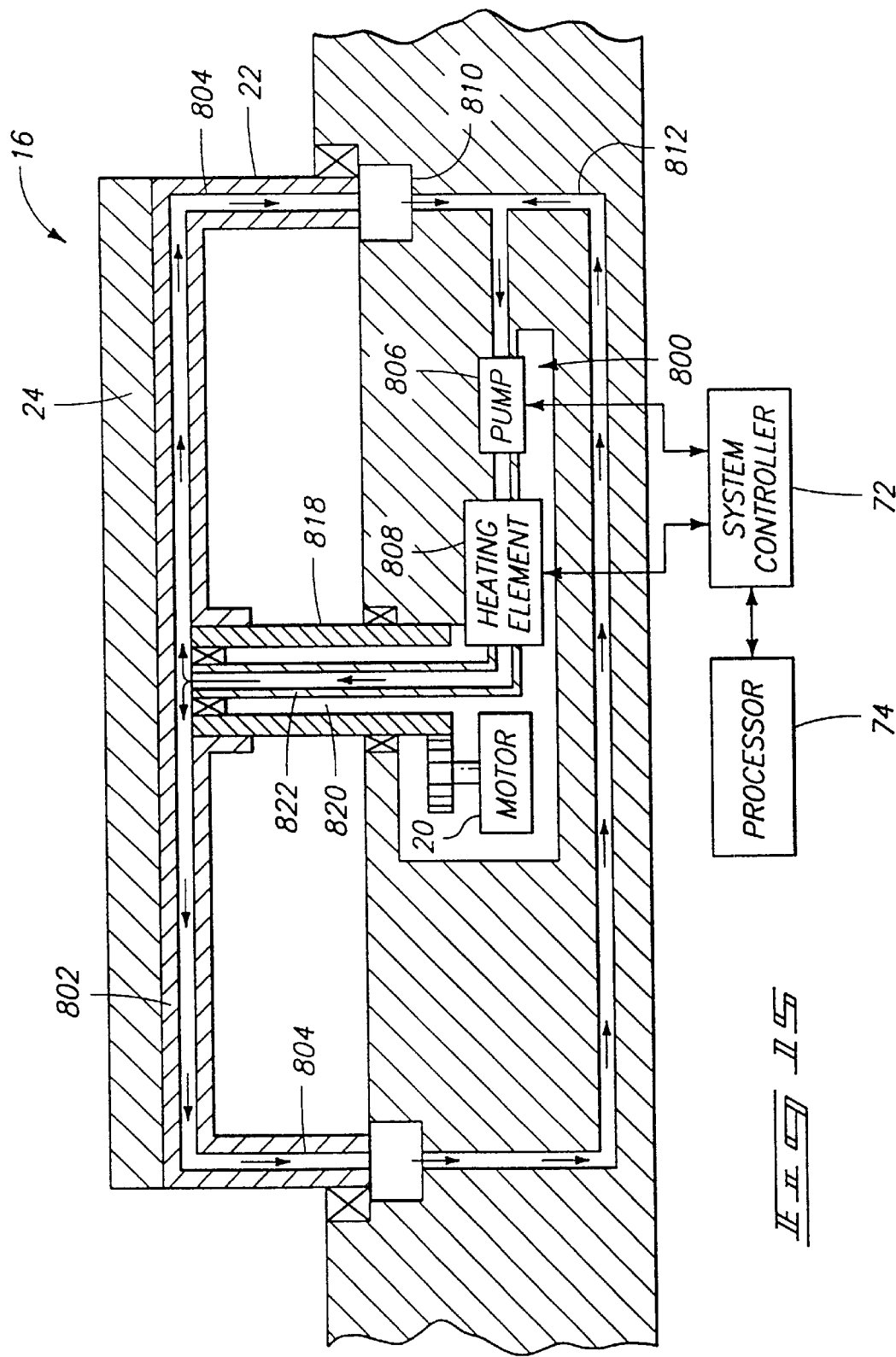

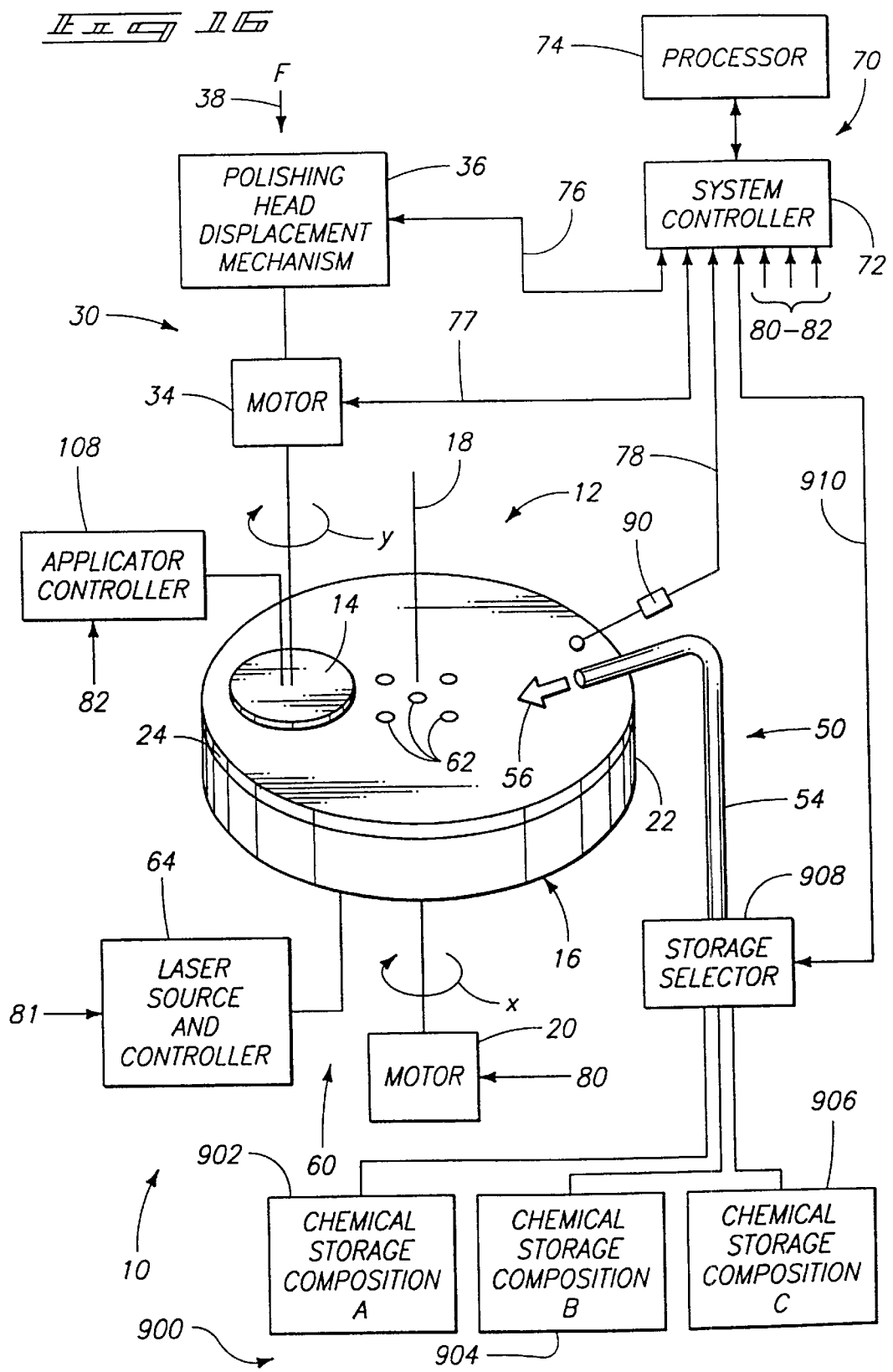

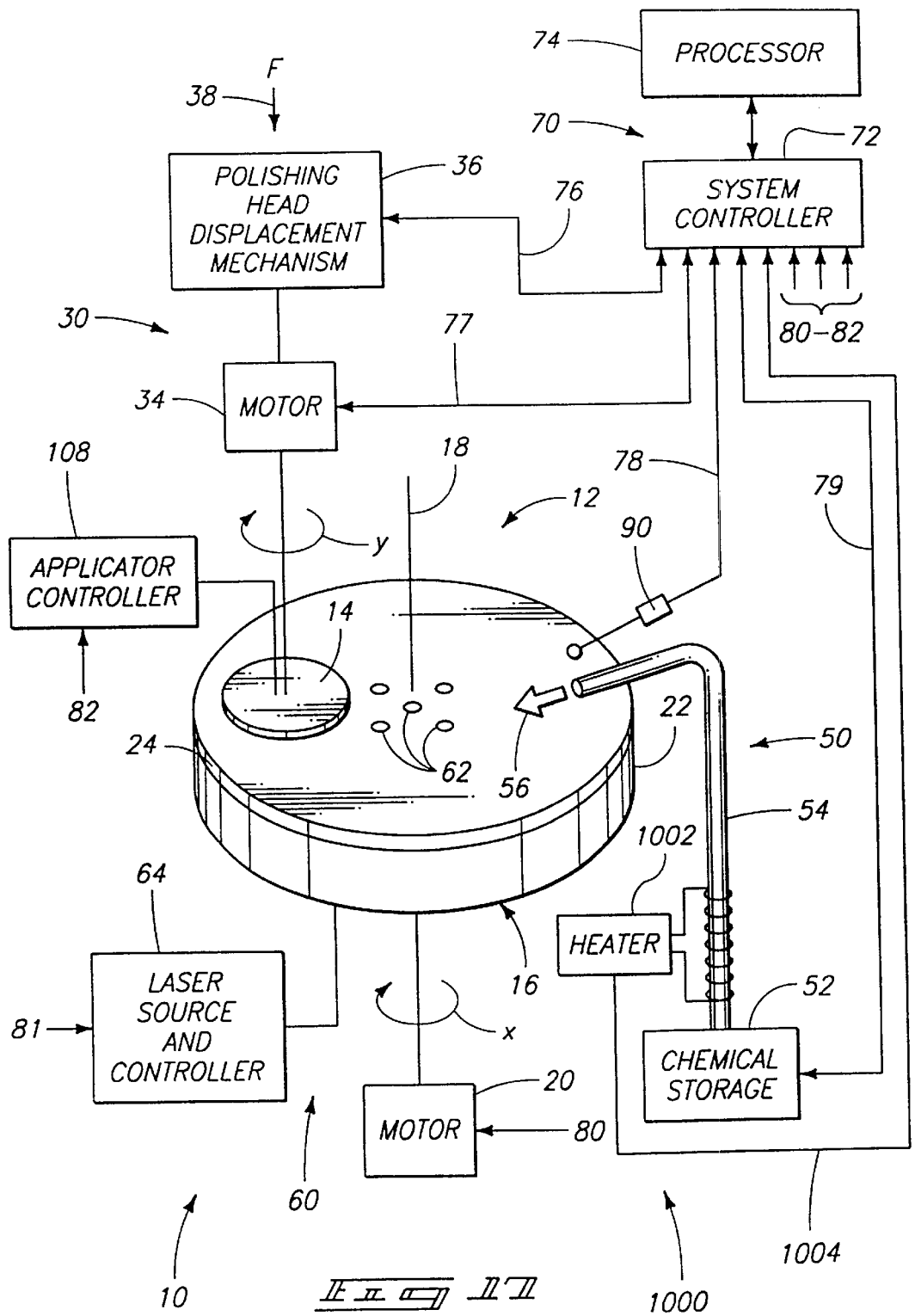

SYSTEM FOR REAL-TIME CONTROL OF SEMICONDUCTOR WAFER POLISHING

CROSS REFERENCE TO RELATED APPLICATION

This patent application is a Divisional Application of U.S. patent application Ser. No. 09/838,298, filed Apr. 18, 2001, entitled "System for Real-Time Control of Semiconductor Wafer Polishing," naming Gurtej S. Sandhu and Trung Tri Doan as inventors, which is a Divisional Application of U.S. patent application Ser. No. 09/444,022, filed Nov. 19, 1999, now U.S. Pat. No. 6,306,009, which is a Continuation of U.S. patent application Ser. No. 09/181,433, filed Oct. 28, 1998, now U.S. Pat. No. 6,120,347, which is a Continuation of U.S. patent application Ser. No. 08/907,389, filed Aug. 7, 1997, now U.S. Pat. No. 5,851,135, which in turn is a Continuation of U.S. patent application Ser. No. 08/547,529, filed Oct. 24, 1995, now U.S. Pat. No. 5,700,180, which in turn is a Continuation-In-Part of U.S. patent application Ser. No. 08/112,759, filed Aug. 25, 1993, now U.S. Pat. No. 5,486,129.

TECHNICAL FIELD

This invention relates to systems for polishing semiconductor wafers.

BACKGROUND OF THE INVENTION

In the fabrication of integrated circuits, numerous integrated circuits are typically constructed simultaneously on a single semiconductor wafer. The wafer is then later subjected to a singulation process in which individual integrated circuits are singulated from the wafer. At certain stages of fabrication, it is often necessary to polish a surface of the semiconductor wafer. In general, a semiconductor wafer can be polished to remove high topography, surface defects such as crystal lattice damage, scratches, roughness, or embedded particles of dirt or dust. This polishing process is often referred to as mechanical planarization (MP) and is utilized to improve the quality and reliability of semiconductor devices. This process is usually performed during the formation of various devices and integrated circuits on the wafer.

The polishing process may also involve the introduction of a chemical slurry to facilitate higher removal rates and selectivity between films of the semiconductor surface. This polishing process is often referred to as chemical mechanical planarization (CMP).

In general, the polishing process involves holding and rotating a thin flat wafer of semiconductor material against a polishing surface under controlled pressure and temperature. One such apparatus for polishing thin flat semiconductor wafers is discussed in our U.S. Pat. No. 5,081,796. Other apparatuses are described in U.S. Pat. Nos. 4,193,226 and 4,811,522 to Gill, Jr. and U.S. Pat. No. 3,841,031 to Walsh.

One problem encountered in polishing processes is the non-uniform removal of the semiconductor surface. Removal rate is directly proportional to downward pressure on the wafer, rotational speeds of the platen and wafer, slurry particle density and size, slurry composition, and the effective area of contact between the polishing pad and the wafer surface. Removal caused by the polishing platen is related to the radial position on the platen. The removal rate is increased as the semiconductor wafer is moved radially outward relative to the polishing platen due to higher platen rotational velocity. Additionally, removal rates tend to be higher at wafer edge than at wafer center because the wafer edge is rotating at a higher speed than the wafer center.

Another problem in conventional polishing processes is the difficulty in removing non-uniform films or layers which have been applied to the semiconductor wafer. During the fabrication of integrated circuits, a particular layer or film may have been deposited or grown in a desired uneven manner resulting in a non-uniform surface which is subsequently subjected to polishing processes. The thicknesses of such layers or films can be very small (on the order of 0.5 to 5.0 microns), thereby allowing little tolerance for non-uniform removal. A similar problem arises when attempting to polish warped surfaces on the semiconductor wafer. Warpage can occur as wafers are subjected to various thermal cycles during the fabrication of integrated circuits. As a result of this warpage, the semiconductor surface has high and low If areas, whereby the high areas will be polished to a greater extent than the low areas.

As a result of these polishing problems, individual regions of the same semiconductor wafer can experience different polishing rates. As an example, one region may be polished at a much higher rate than that of other regions, causing removal of too much material in the high rate region or removal of too little material in the lower rate regions.

A compounding problem associated with polishing semiconductor wafers is the inability to monitor polishing conditions in an effort to detect and correct the above inherent polishing problems as they occur. It is common to conduct numerous pre-polishing measurements of the wafer before commencement of the polishing process, and then conduct numerous similar post-polishing measurements to determine whether the polishing process yielded the desired topography, thickness, and uniformity. However, these pre- and post-polishing measurements are labor intensive and result in a low product throughput.

The present invention provides a polishing system and method which significantly reduces the problems associated with non-uniform removal and monitoring of the polishing process.

BRIEF DESCRIPTION OF THE DRAWINGS

One or more preferred forms of the invention are described herein with reference to the accompanying drawings. Like components and features are referenced by like numerals throughout the drawings. The drawings are briefly described below.

FIG. 3 shows the pressure applicators in their retracted positions.

FIG. 13 is a top view showing a platen subassembly included in a polishing system according to another aspect of this invention.

FIG. 14 is a diagrammatic sectional view of the platen subassembly taken along line 14—14 of FIG. 13.

FIG. 15 is a diagrammatic sectional view of a platen subassembly according to another aspect of this invention.

FIG. 16 is a diagrammatic perspective view of a polishing system according to another aspect of the invention.

FIG. 17 is a diagrammatic perspective view of a polishing system according to another aspect of the invention.

DETAILED DESCRIPTION OF THE PREFERRED EMBODIMENTS

Figure 1:
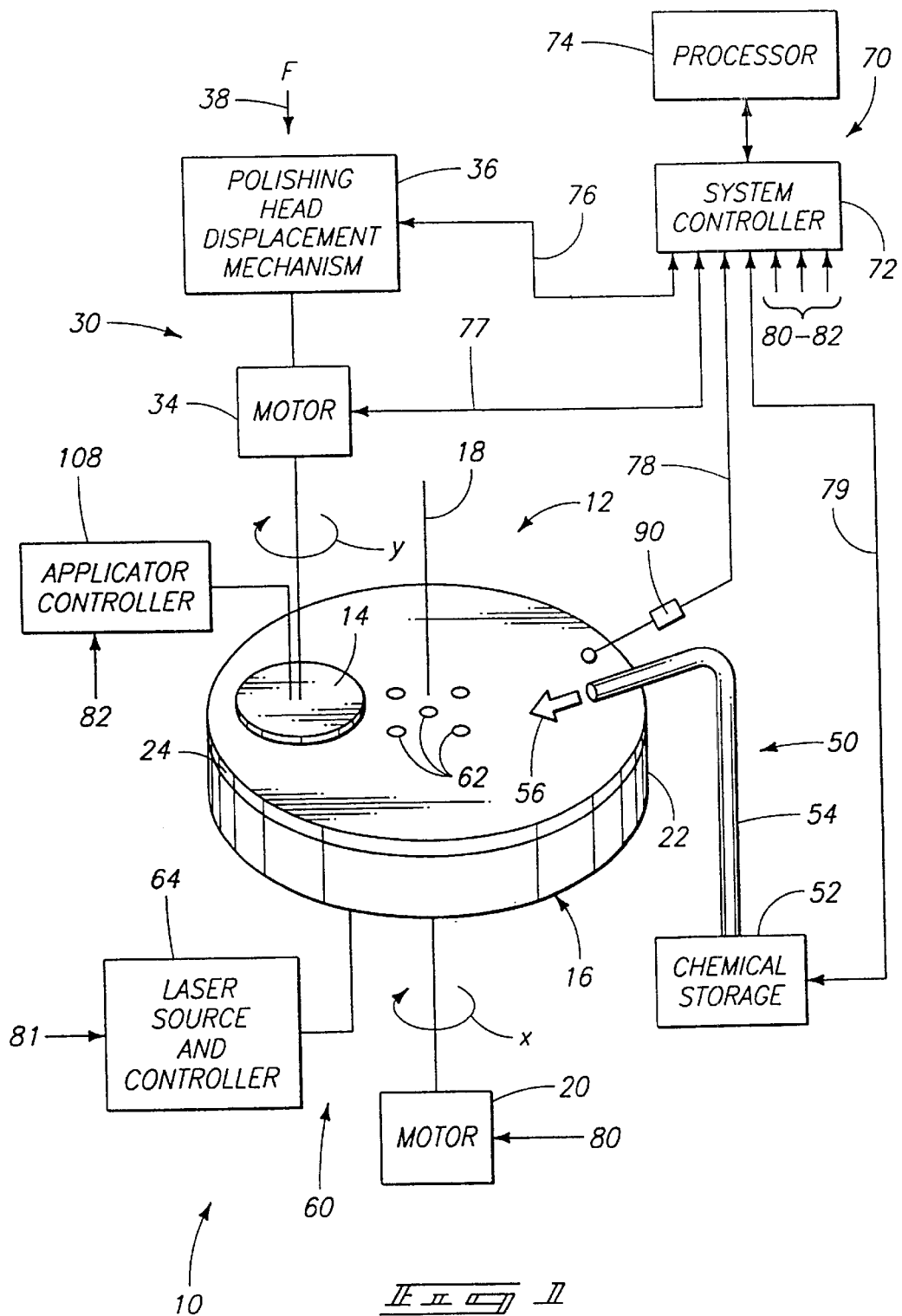
FIG. 1 is a diagrammatic perspective view of a polishing system according to the invention.

This disclosure of the invention is submitted in furtherance of the constitutional purposes of the U.S. Patent Laws "to promote the progress of science and useful arts" (Article 1, Section 8).

In accordance with one aspect of this invention, a system for polishing a semiconductor wafer comprises a wafer polishing assembly for polishing a face of a semiconductor wafer at a polishing rate and a polishing uniformity. The wafer polishing assembly has a plurality of controllable operational parameters that upon variation change the polishing rate and polishing uniformity. The system also comprises a controller operably coupled to the wafer polishing assembly for monitoring and managing in situ at least one of the operational parameters of the wafer polishing assembly. A processor is operably coupled to the controller for determining a set of desired operational parameters based on the monitored operational parameters and for outputting control information indicative of the desired operational parameters to the controller. The controller adjusts in situ at least one of the operational parameters of the wafer polishing assembly in response to the control information from the processor to effectuate a new polishing rate and a new polishing uniformity as the wafer polishing assembly continues to polish the face of the semiconductor wafer.

These operational parameters include platen rotational velocity, wafer rotational velocity, the polishing path of the wafer, the wafer speed across the platen, the down force exerted on the wafer, slurry composition, slurry flow rate, and temperature at the wafer surface.

According to another aspect of this invention, a system for polishing a semiconductor wafer comprises a rotatable platen subassembly which defines a polishing area and a drive mechanism coupled to rotate the platen subassembly at a platen velocity. The system further comprises a polishing head for supporting a semiconductor wafer and holding a face of the semiconductor wafer in contact with the platen subassembly to polish the wafer face whereby individual regions of the wafer face have different polishing rates. The polishing head has pressure applicators for applying various localized pressures on individual regions of the semiconductor wafer to cause the semiconductor wafer to conform the wafer face to a selected contour. The system also comprises a polish control subsystem for monitoring in situ the polishing rates at various regions of the semiconductor wafer and adjusting in situ at least one of the platen velocity and the individual localized pressures applied to the semiconductor wafer to change the polishing rates of the individual regions of the semiconductor wafer.

In another aspect of the invention, a system for polishing a semiconductor wafer comprises a wafer polishing assembly for polishing a face of a semiconductor wafer at a polishing rate and a polishing uniformity, the wafer polishing assembly including a platen subassembly defining a polishing area, and a polishing head selectively supporting a semiconductor wafer and holding a face of the semiconductor wafer in contact with the platen subassembly under an adjustable polishing force to polish the wafer face; and a controller selectively adjusting the polishing force during polishing of the wafer.

In another aspect of the invention, a system for polishing a semiconductor wafer comprises a wafer polishing assembly for polishing a face of a semiconductor wafer at a polishing rate and a polishing uniformity, the wafer polishing assembly including a platen subassembly defining a polishing area, and a polishing head selectively supporting a semiconductor wafer and holding a face of the semiconductor wafer in contact with the platen subassembly and translating the wafer relative to the platen subassembly along an adjustable polishing path to polish the wafer face; and a controller selectively adjusting the polishing path during polishing of the wafer.

In another aspect of the invention, a system for polishing a semiconductor wafer, the system comprises a wafer polishing assembly for polishing a face of a semiconductor wafer at a polishing rate and a polishing uniformity, the wafer polishing assembly including a platen subassembly defining a polishing area, and a polishing head selectively supporting a semiconductor wafer and holding a face of the semiconductor wafer in contact with the platen subassembly, and translating the wafer across the platen subassembly at an adjustable wafer movement rate, to polish the wafer face; and a controller selectively adjusting the wafer movement rate during polishing of the wafer.

In another aspect of the invention, a system for polishing a semiconductor wafer comprises a wafer polishing assembly for polishing a face of a semiconductor wafer at a polishing rate and a polishing uniformity, the wafer polishing assembly including a platen rotatable about a first axis, a polishing head which supports the semiconductor wafer for rotation about a second axis, and a polishing head displacement mechanism which moves the polishing head and wafer across the platen, the wafer polishing assembly having a plurality of controllable operational parameters that upon variation change the polishing rate and polishing uniformity; a controller operably coupled to the wafer polishing assembly for monitoring and managing in situ at least one of the operational parameters of the wafer polishing assembly; a processor operably coupled to the controller for determining a set of desired operational parameters based on the monitored operational parameters and outputting control information indicative of the desired operational parameters to the controller, the controller adjusting in situ at least one of the operational parameters of the wafer polishing assembly in response to the control information from the processor to effectuate a new polishing rate and a new polishing uniformity as the wafer polishing assembly continues to polish the face of the semiconductor wafer; and a detector operating on the wafer and communicating with the processor to determine whether polishing of the wafer is complete.

Figure 2:
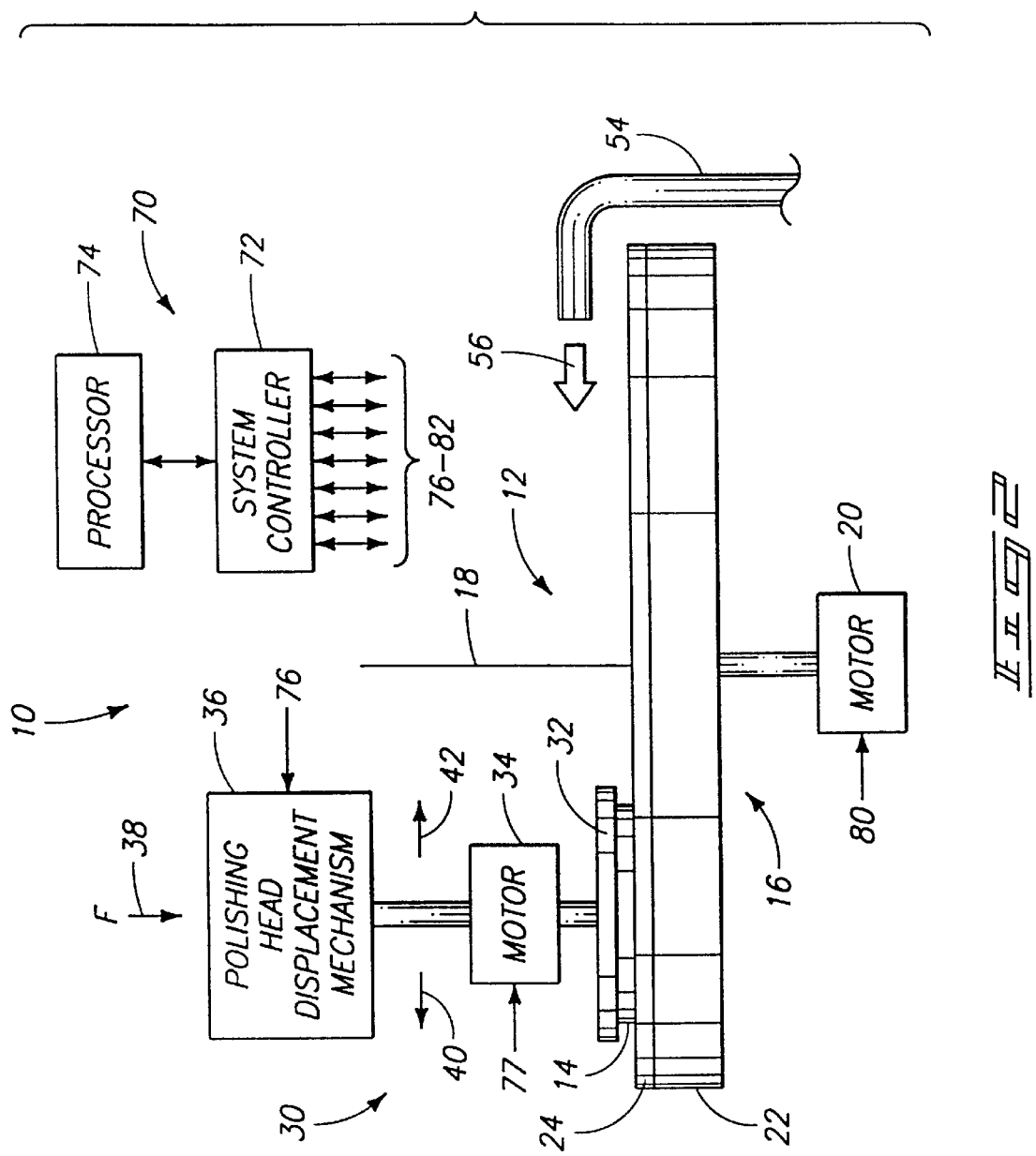
FIG. 2 is a diagrammatic side view of the polishing system.

FIGS. 1–2 are diagrammatical illustrations of a polishing system 10 for polishing a semiconductor wafer. In its preferred form, system 10 includes a chemical or slurry supply system 50 for introducing a chemical slurry into the polishing environment to facilitate wafer polishing. Accordingly, in its preferred form, system 10 is a chemical mechanical planarization (CMP) apparatus. However, as will be more apparent in the continuing discussion, this invention is also capable of being practiced using mechanical polishing techniques without introduction of a chemical slurry.

Polishing system 10 has a wafer polishing assembly 12 for polishing a face of a semiconductor wafer 14. Wafer polishing assembly 12 includes a rotatable platen subassembly 16 that is rotated at a platen velocity $V_P$ about a center axis 18 by a motor or other drive mechanism 20. The platen subassembly can be rotated in a clockwise direction x (FIG. 1) or in the counterclockwise direction. Platen subassembly 16 includes a platen 22 and a pad 24 mounted on the platen. Both the platen 22 and pad 24 are preferably circular. Pad 24 protects platen 22 from the chemical slurry introduced during the polishing process, and is typically made of blown polyurethane. As used in this disclosure, the term "platen subassembly" is intended to include both a platen without a pad (i.e., for some mechanical planarization situations) and a platen provided with a pad (i.e., for chemical mechanical planarization situations).

Wafer polishing assembly 12 also includes polishing head subassembly 30 which consists of polishing head 32 (FIG. 2), motor or other drive mechanism 34, and polishing head displacement mechanism 36. Polishing head 32 supports semiconductor wafer 14 and holds the wafer face in contact with pad 24 of platen subassembly 16. Polishing head 32 applies a controlled adjustable downward force F (as illustrated by arrow 38) to press semiconductor wafer 14 into pad 24 to facilitate polishing of the wafer face. Motor 34 rotates polishing head 32 and wafer 14 at a wafer velocity $V_W$ in a clockwise rotational direction y which is preferably the same rotational direction of platen subassembly 16 (although wafer 14 can be rotated in the counterclockwise direction or opposite to rotation of the platen subassembly as desired).

Polishing head displacement mechanism 36 moves polishing head 32 and wafer 14 under controlled force F across platen subassembly 16 as indicated by arrows 40 and 42. The wafer is moved at an adjustable rate and along a variable polishing path. The polishing path can be linear, sinusoidal, or a variety of other patterns. Polishing head displacement mechanism 36 is also capable of moving semiconductor wafer 14 along a polishing path to a location beyond the edge of pad 24 so that wafer 14 "overhangs" the edge. This overhang arrangement permits wafer 14 to be moved partially on and partially off pad 24 to compensate for polishing irregularities caused by relative velocity differential between the faster moving outer portions and the slower moving inner portions of platen subassembly 16.

Polishing head 32 includes means for holding the semiconductor wafer 14. One example holding means is a vacuum-type mechanism which generates a negative vacuum force to draw the wafer against the polishing head. The vacuum-type mechanism is helpful in initially lifting and positioning the wafer on the polishing head. Once the wafer is positioned on the polishing head and held in contact with the platen subassembly for polishing, the vacuum force can be removed. The polishing head is designed with a friction surface, or alternatively includes a carrier pad, which engages the upper, non-exposed face of the wafer and the friction force created between the polishing head and wafer effectively holds the wafer against the polishing head and causes the wafer to rotate at the same velocity as the polishing head. Such polishing heads and carrier pads are of conventional design and are commercially available.

FIGS. 3–6 illustrate another polishing head 100 unique to this invention which can be used in the polishing system 10. Polishing head 100 has a wafer carrier 102 sized to accommodate semiconductor wafer 14. Wafer carrier 102 has a relatively flat surface and a surrounding, annular flange 104 which defines a holding area. An upper, backside, or non-exposed face of semiconductor wafer 14 lies in juxtaposition with the flat surface of the wafer carrier 102. A lower, frontside, or exposed face of wafer 14 is held in contact with pad 24 during polishing. Flange 104 is sized to extend partially along and around wafer 14 to assist in maintaining the wafer within the holding area.

Polishing head 100 also has one or more pressure applicators 106 provided on the wafer carrier 102. The pressure applicators 106 are individually controllable to move over a range of positions from retracted positions (FIG. 3) to extended positions (FIG. 4, for some of the applicators). Under a preferred embodiment, a carrier pad is located over the wafer carrier 102 between the pressure applicators 106 and the wafer. The carrier pad induces an effective friction at the wafer backside to cause the wafer to rotate with the wafer carrier and not slip. The carrier pad is not shown for purposes of clarity in describing the contour changing effect on the wafer caused by the individually is controllable pressure applicators.

The applicators 106 operatively engage the non-exposed face of the semiconductor wafer (preferably, through the carrier pad) and, as moved toward their extended positions, apply multiple isolated localized pressures on individual regions of the wafer. The localized pressures cause the semiconductor wafer to bend or bow and alter the contour of the exposed face being held against pad 24.

Figure 5:
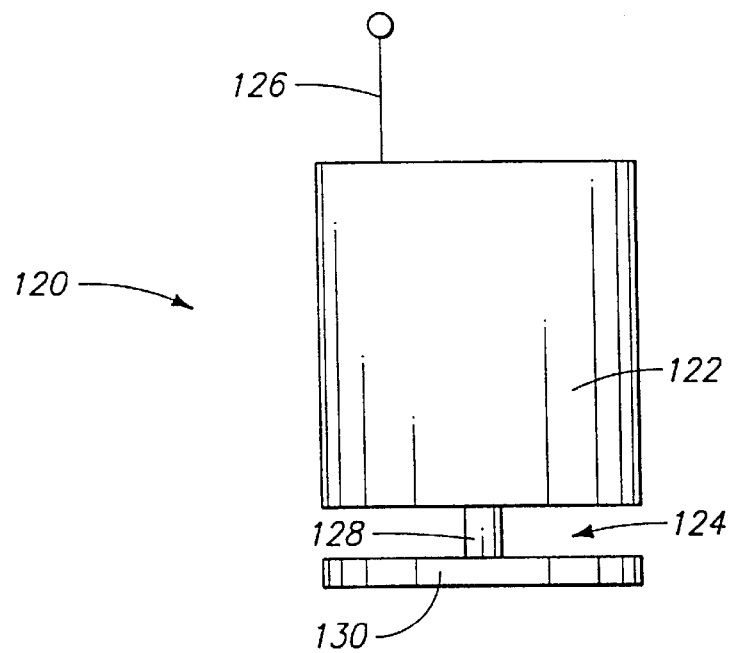
FIG. 5 is an enlarged diagrammatic side view of a pressure applicator for use in the FIG. 3 polishing head according to one embodiment of this invention.
Figure 6:
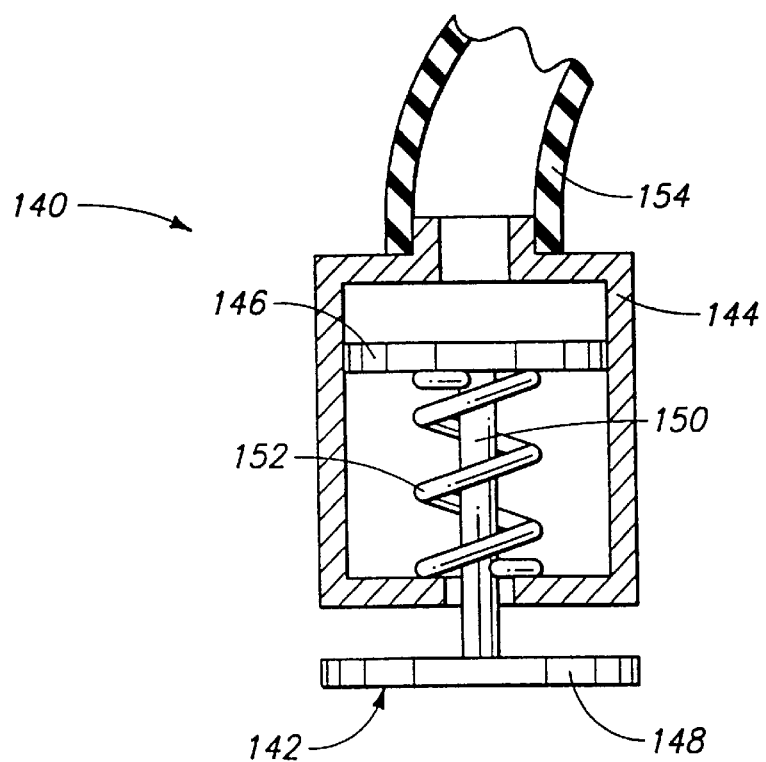
FIG. 6 is an enlarged diagrammatic side view of a pressure applicator for use in the FIG. 3 polishing head according to another embodiment of this invention.

Individual pressure applicators 106 preferably include a slidable piston which controllably moves between a retracted and extended position. FIGS. 5 and 6 show two embodiments of a piston-based pressure applicator. In FIG. 5, pressure applicator 120 comprises a solenoid or servo-mechanism 122 which operatively drives a piston 124 to a desired position in response to electrical signals received on input line(s) 126. Piston 124 includes a shaft 128 and a flat, circular disk 130 mounted to the shaft.

In FIG. 6, pressure applicator 140 comprises an "I"-shaped piston 142 slidably mounted with a hollow, cylindrical housing 144. Piston 142 has an upper disk 146 sized to fit closely within the interior surface of housing 144, a lower disk 148 positioned outside of housing 144, and a shaft 150 interconnecting the two disks. A spring 152 is disposed about shaft 150 between a bottom wall or floor of housing 144 and the upper disk 146 to bias the piston 142 to its retracted position. Housing 144 has an upper opening which is operatively coupled to a tube or conduit 154 to provide fluid communication between the conduit 154 and the housing chamber. A fluid (which can be gas or liquid) is transferred under controlled pressure through conduit 154 against upper piston disk 146, whereby the pressure is effective to overcome the bias of spring 152 to cause the desired movement of piston 142.

Figure 3:
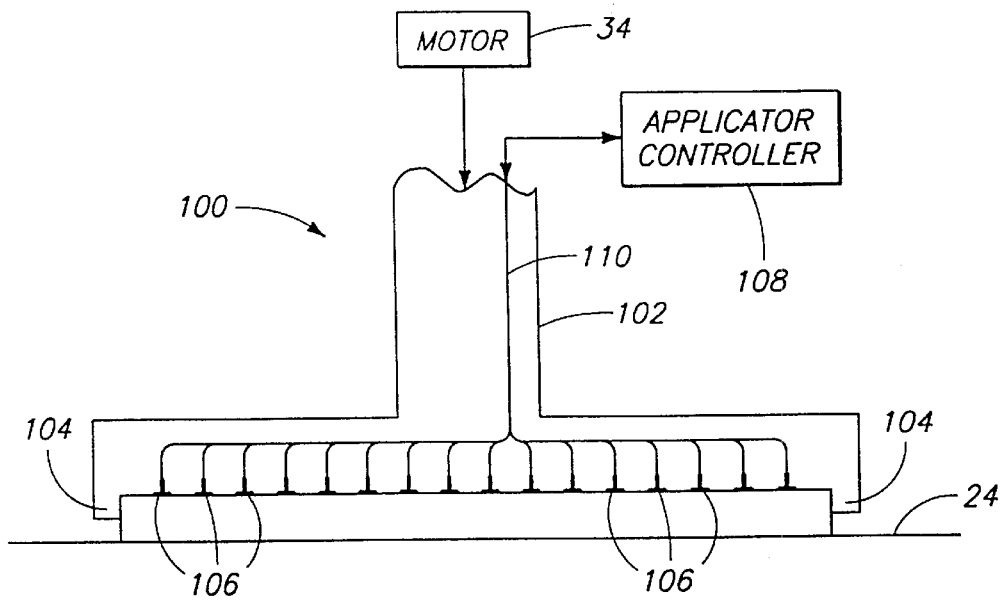
FIG. 3 is a diagrammatic side view of a polishing head according to another aspect of this invention. The polishing head has multiple pressure applicators.
Figure 4:
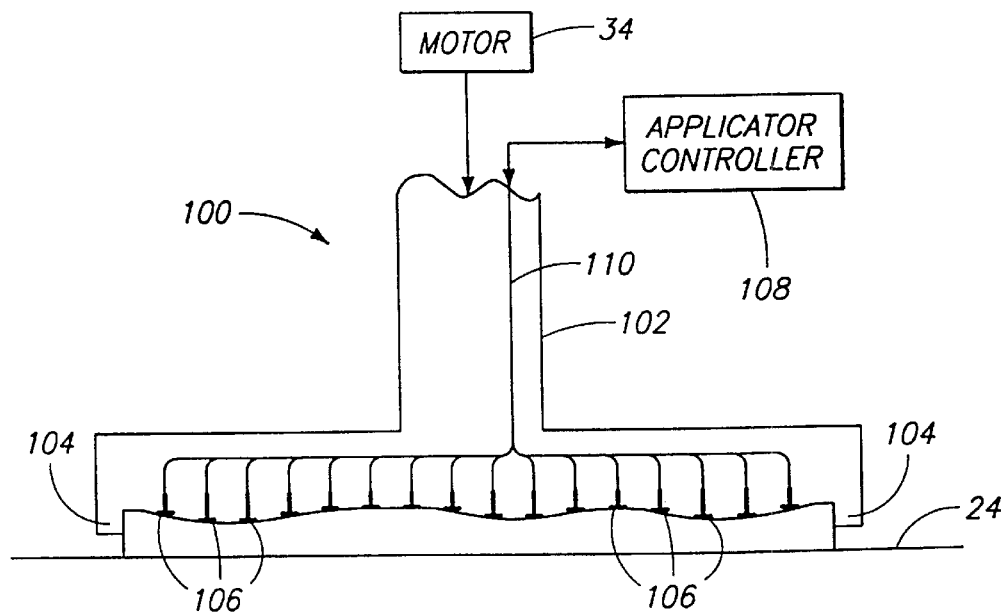
FIG. 4 is a diagrammatic side view similar to FIG. 3 and illustrates some of the pressure applicators in extended positions.

As shown in FIGS. 3 and 4, applicators 106 are individually coupled to an applicator controller 108 via a suitable connecting means 110. When the servomechanism pressure applicators 120 of FIG. 5 are used, applicator controller 108 consists of a servo-electric applicator controller which generates e signals that operatively position the servomechanism pressure applicators 120. The connecting means 110 consists of a bus or conductors suitable to carry the electric signals from the servo-electric applicator controller to individual applicators and to provide feedback. On the other hand, when pressure applicators 140 of FIG. 6 are employed, applicator controller 108 consists of a fluid force generator which outputs a fluid under a controlled pressure. The connecting means 110 consists of tubing or conduits to transfer fluid under pressure from the fluid force generator to individual applicators.

According to the polishing head of this invention, the polishing rates of individual regions across the wafer face can be independently controlled to effectuate the desired polishing results. Prior to this invention, the semiconductor experienced different polishing rates in various regions across the wafer face caused by the polishing environment including such things as platen velocity, wafer velocity, slurry composition, type of material on the wafer face, the down force applied to the wafer, and wafer movement across the platen. This invention is advantageous because it provides superior control in selectively isolating and changing the polishing rates of specific regions of the semiconductor wafer in a real-time manner during polishing while globally polishing the entire wafer.

With reference again to FIGS. 1 and 2, wafer polishing assembly 12 also includes chemical supply system 50 for introducing a chemical slurry of a desired composition. Chemical supply system 50 has a chemical storage 52 for storing slurry and a conduit 54 for transferring the slurry from chemical storage 52 to the polishing area atop platen subassembly 16. Chemical supply system 50 introduces slurry as indicated by arrow 56 atop pad 24 at a selected flow rate. This chemical slurry provides an abrasive material which facilitates polishing of the wafer face, and is preferably a composition formed of a solution including solid alumina or silica. However, according to this invention, the composition can be controllably altered to add or remove individual chemicals from the slurry, or to change the ratios within the composition.

Wafer polishing assembly 12 has a film thickness measurement device 60 for measuring topography of the wafer face during polishing. Film thickness measurement device 60 is preferably implemented in the form of a laser interferometer measuring apparatus which employs interference of light waves for purposes of measurement. The laser interferometer measuring apparatus includes light transmitter/receiver units 62 provided at the surface of the platen subassembly 16 which transmit light at the wafer face and collect reflections therefrom. The laser apparatus also includes laser source and controller 64 which is optically coupled to units 62. The laser apparatus is configured to measure thicknesses and contour of films and materials on the wafer face. Apart from the laser apparatus, this invention also contemplates other techniques and systems that can be used as a film thickness measurement device including a system for measuring capacitance change during wafer polishing, a device for detecting friction change at the wafer surface, and an acoustic mechanism for measuring wave propagation as films and layers are removed during polishing.

Wafer polishing assembly 12 also includes a temperature sensor 90 positioned to detect temperature within the polishing area atop the pad 24.

Polishing system 10 further includes a polish control subsystem 70 for monitoring in situ the operating parameters of the polishing system and adjusting in situ one or more polishing parameters to effectuate the desired polishing results for a particular semiconductor wafer. The operating parameters are such that variation of one or more of the parameters effectively changes the polishing rates and polishing uniformity across the wafer face.

Polish control subsystem 70 includes a system controller 72 and a processor 74. System controller 72 is operatively coupled to the components of the system via connectors 76–82 (and various other connectors shown in FIGS. 7–16) to monitor and manage in real-time at least one of the operational parameters. The parameters are input to processor 74 which determines the present state polishing status of the semiconductor wafer, including polishing uniformity and various polishing rates across the wafer. Processor 74 then determines a set of desired operational parameters which effectuates the desired polishing uniformity and rates, and outputs control information indicative of these desired parameters. Processor 74 can be embodied as a microprocessor, an ASIC, or some other processing means for determining the desired operational parameters. Processor 74 may include computational means for calculating specific parameters, memory look-up tables for generating values given the measured parameters, or neural networks and fuzzy logic techniques for systematically arriving at optimal parameters.

The controller 72 uses the control information to adjust the system components and thereby modify the operational parameters which will tend to subject the wafer to polishing conditions that more closely approximate the desired polishing uniformity and rates. More specifically, controller 72 is coupled to polishing head displacement mechanism 36 via connector 76 to monitor and controllably adjust in situ the polishing path of the semiconductor wafer and the speed at which the wafer is moved across the platen subassembly 16. Controller 72 is coupled to motor 34 via connector 77 to monitor the motor rpm and wafer velocity imparted by the polishing head. Controller 72 commands the motor to speed up or slow down based on the information received from processor 74. Controller 72 is coupled to motor 20 via connector 80 to monitor the motor rpm and platen velocity of platen subassembly 16, and to adjust the speed of the platen subassembly as desired.

Controller 72 is connected to slurry supply means 50 via connector 79 to monitor and adjust slurry composition and flow rate. Controller 72 is coupled to temperature sensor 90 via connector 78 to receive feedback information concerning temperature of the polishing environment and wafer surface. Connector 81 conveys control signals and feedback information between controller 72 and film thickness measurement device 60.

When system 10 is adapted to incorporate polishing head 100 of FIGS. 3 and 4, applicator controller 108 is operatively coupled via connector 82 to system controller 72. According to this embodiment, controller 72 can make independent adjustments to one or more of the pressure applicators 106 on head 100, causing manipulation of the wafer face contour. This control permits regional or localized polishing with a semiconductor wafer.

Controller 72 works in conjunction with film thickness measurement device 60 to determine the polishing rates and uniformity across the wafer during real-time evaluations. This information is passed to processor 74 which then generates a map indicative of the polish rates and/or uniformity across the semiconductor wafer face for use in adjusting system operational parameters. Preferably, this map is generated on a periodic basis. In one embodiment, such mapping is performed using the techniques disclosed in U.S. Pat. No. 5,196,353, issued to Sandhu et al., assigned to the assignee of the present invention, and incorporated herein by reference. The technique disclosed in U.S. Pat. No. 5,196,353 involves using an infrared camera to detect infrared waves emitted from a wafer and correlating this information to the heat of various points on the wafer. Using this arrangement, the relative temperature at any point on the wafer is detected and mapped, and an infrared image of the surface of the wafer is developed.

Figure 7:
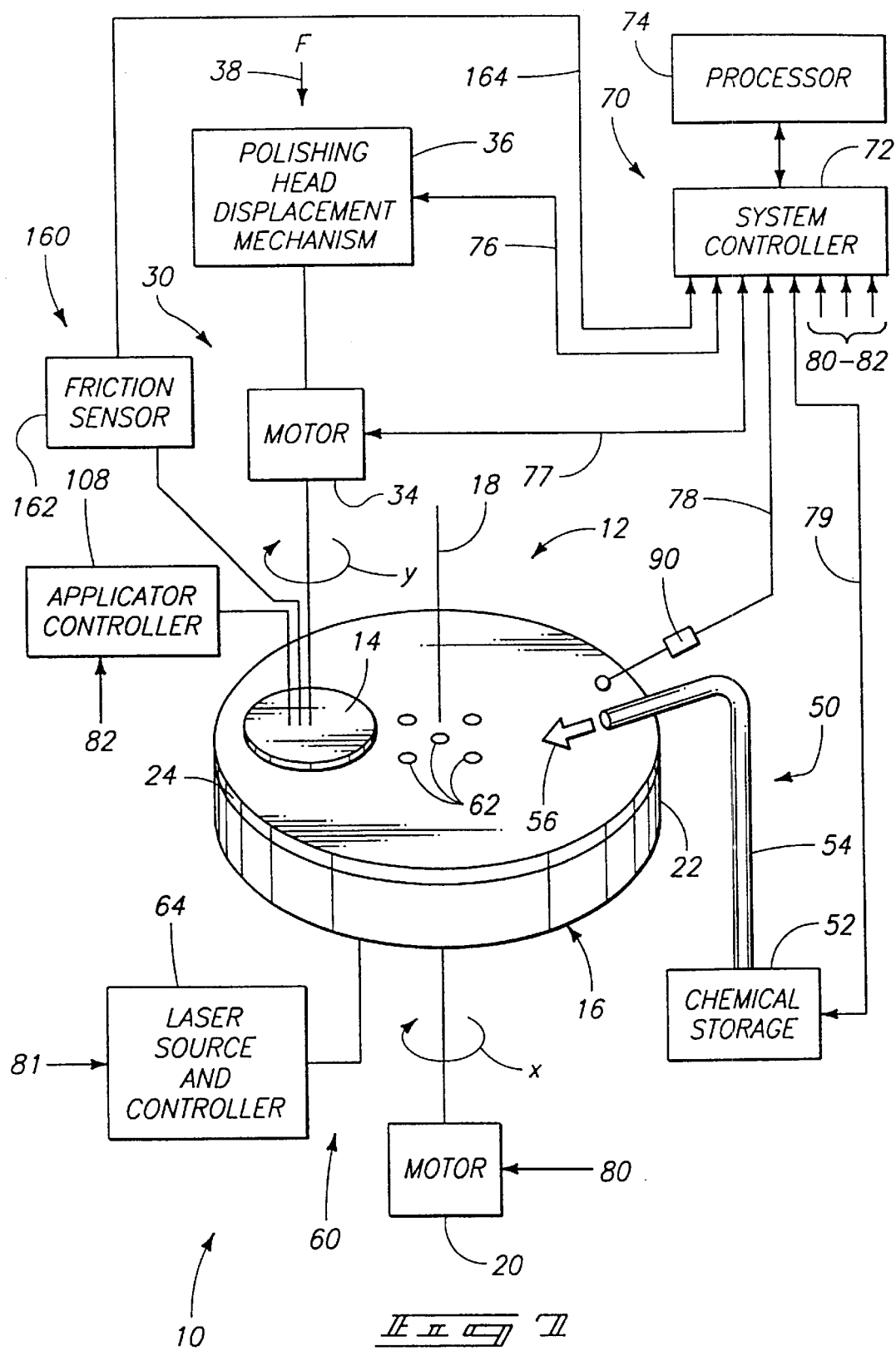
FIG. 7 is a diagrammatic perspective view of a polishing system including an end point detector, according to another embodiment of this invention.

In one embodiment, shown in FIG. 7, the system 10 further comprises an end point detector (or end point detection means) 160 operating on the wafer and communicating with the system controller 72, and thus with the processor 74, for determining if polishing of the wafer is complete. In the embodiment shown in FIG. 7, the end point detector comprises means for sensing a change in friction between the wafer and the polishing platen. Such friction sensing is disclosed in detail in U.S. Pat. Nos. 5,036,015, and 5,069,002 issued to Sandhu et al., assigned to the assignee of the present invention, and incorporated herein by reference.

More particularly, in the embodiment shown in FIG. 7, the end point detector 160 comprises a friction sensor 162 sensing friction between the wafer and the polishing platen. The friction sensor 162 is in communication with the controller 72 (and thereby with the processor 74) via conductor 164.

As the semiconductor wafer is rotated and pressed against the platen subassembly 16, the oxide surface of the wafer contacts the polishing pad 24 of the platen 22. The oxide surface of the wafer has a hardness that produces a coefficient of friction when contacting the pad 24, which depends in part on the amount and composition of the slurry delivered by the slurry supply system 50. The coefficient of friction remains substantially constant until the oxide is polished away to a point where IC devices on the wafer are exposed. The IC devices may be of a harder material than the oxide surface of the wafer. A different coefficient of friction is thus present when the oxide is polished away. Similarly, the coefficient of friction is different for different films formed on the wafer. Such different coefficients of friction will be detected using the friction sensor 162. More particularly, the change in friction is detected by the processor 74 which monitors friction over time for given parameters (such as speed of the motor 34, speed of the motor 20, downforce F, etc.). By sensing the change in friction that is not caused by a change in a controllable operating parameter, the processor 74 determines when an end point has been reached, and polishing can stop. The desired end point is preprogrammed into the processor, and can be after the oxide surface is removed, or after a certain film formed on the substrate is removed.

Figure 8:
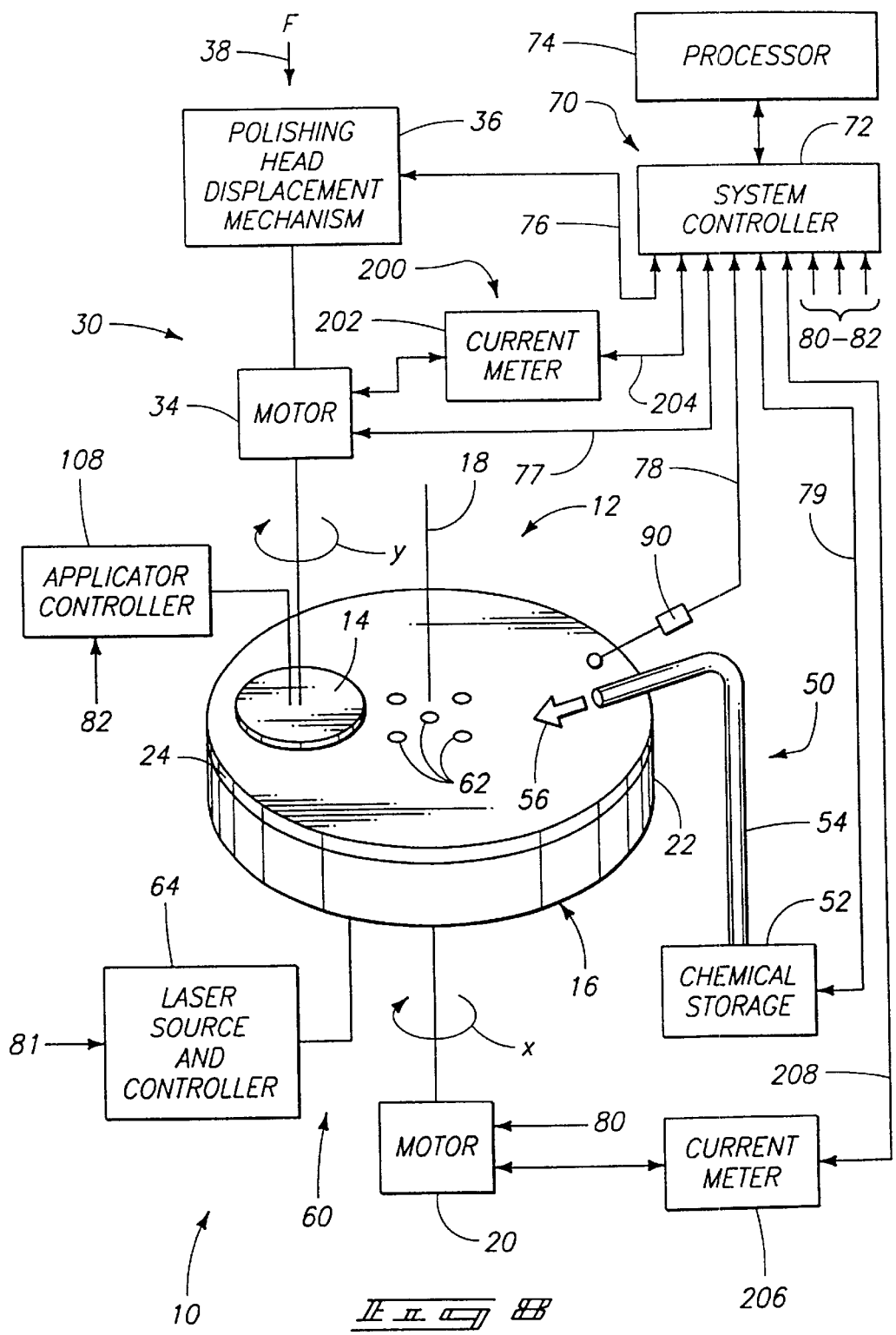
FIG. 8 is a diagrammatic side view of a polishing system including an alternative end point detector.

In an alternative embodiment, shown in FIG. 8, the system includes an end point detector 200 comprising a current meter 202 electrically connected to the motor 34 and in communication with the controller 72 (and thereby with processor 74) via conductor 204, or a current meter 206 electrically connected to the motor 20 and in communication with the controller 72, or both current meters 202 and 206. The current meter 202 and/or 206 indicates to the processor 74 a change in friction by detecting a change in amperage through the motor 34 and/or 20.

Figure 9:
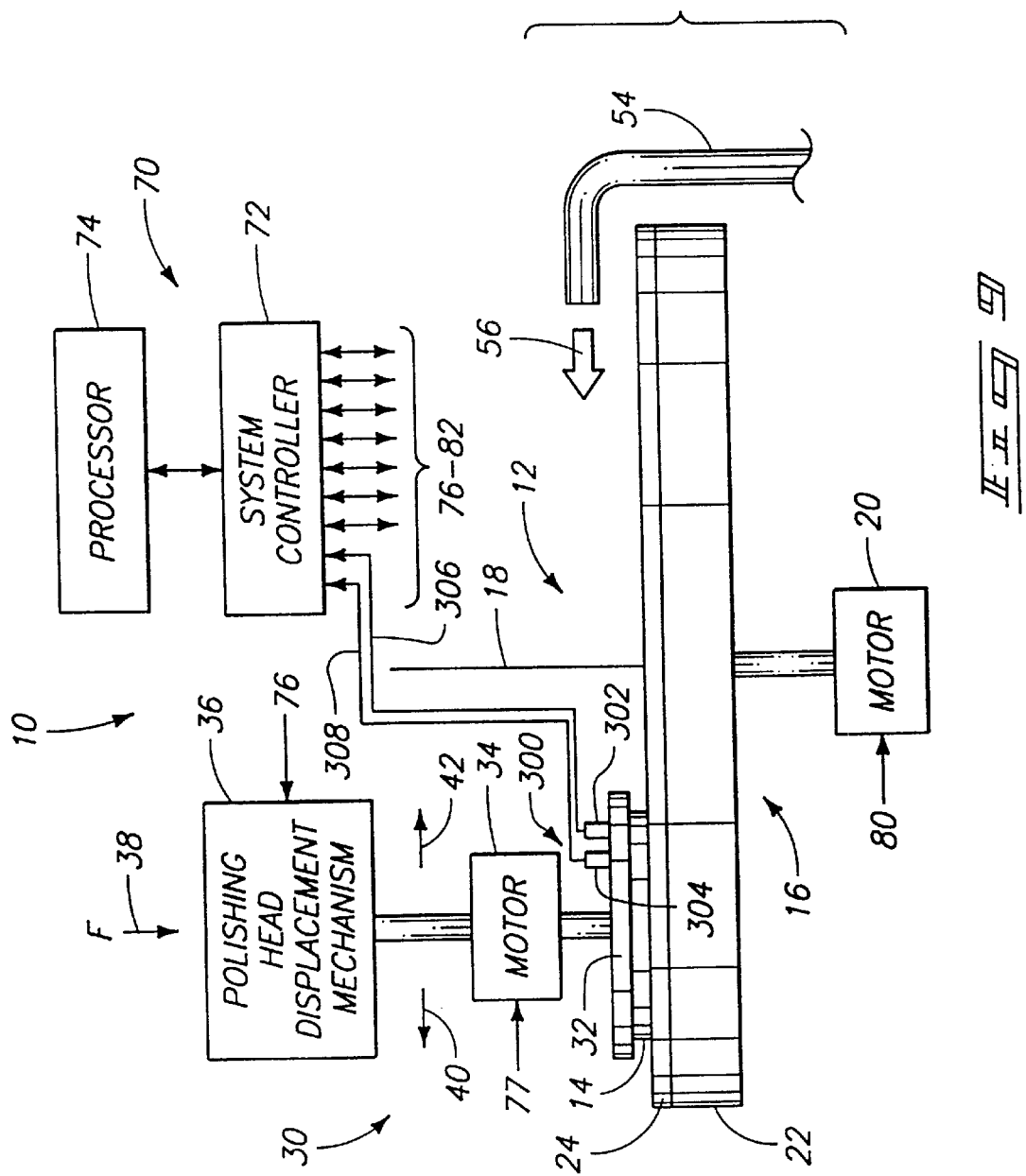
FIG. 9 is a diagrammatic side view of a polishing system including an alternative end point detector.

In an alternative embodiment shown in FIG. 9, the system includes an end point detector (or end point detection means) 300 which comprises means for directing acoustic waves at the wafer, and means for receiving reflected acoustic waves from the wafer. The use of acoustic waves in an end point detector is disclosed in U.S. Pat. No. 5,240,552, issued to Yu et al., assigned to the assignee of the present invention, and incorporated herein by reference.

More particularly, in the illustrated embodiment, the means for directing acoustic waves at the wafer comprises an acoustic wave transducer 302 connected to the controller 72 (and thus to the processor 74) via line 306, and the means for receiving reflected acoustic waves comprises an acoustic wave receiver 304 mounted to receive acoustic waves reflected from the wafer and connected to the controller 72 (and thus to the processor 74) via line 308. The transducer 302 converts an applied electrical voltage into a mechanical strain producing an acoustical wave. In one embodiment, the transducer 302 comprises a piezoelectric transducer, such as a thin film transducer, that converts a voltage into an acoustical wave. Similarly, in one embodiment, the receiver 304 comprises a piezoelectric receiver, such as a thin film receiver, that converts a reflected acoustic wave into a voltage. In the illustrated embodiment, the acoustic waves are directed at the backside of the wafer. In an alternative embodiment (not shown), the waves are directed at the front of the wafer by causing the polishing head displacement mechanism 76 to move the wafer to a location where an acoustic transducer and receiver can act on the front of the wafer. This is, for example, off the platen or at predetermined location on the platen where the transducer and receiver are located. The thickness of the wafer and the oxide layer on the wafer is determined by the processor 74 which analyzes the acoustic wave that is sent by the transducer 302 and the acoustic wave that is received by the receiver 304. More particularly, thickness is determined from the round trip time interval between the launch of an acoustical wave by the transducer 302 and the reception of the reflected wave by the receiver 304, and the speed of the acoustic waves through the layers of the wafer.

The amplitude as well as round trip time of the acoustic waves will change after a film has been completely removed and a different film layer has been contacted. An end point that corresponds to the interfaces of a different film of multiple layers of stacked films can be detected, as well as the end point of an oxide layer. In one embodiment, the planarization of a film is measured in real time by measuring a film thickness at several locations on the wafer.

The system controller 72 causes the transducer 302 to generate acoustical waves, and receives voltage signals from the receiver 304. The processor 74 communicates with the controller 72 to analyze the acoustical waves. More particularly, the controller 72 includes a pulse generator and amplifier driving the transducer 302, includes a low noise amplifier amplifying the signal produced by the receiver 304, and includes a lock in amplifier coordinating the signals generated by the pulse generator and received by the receiver 304.

Figure 10:
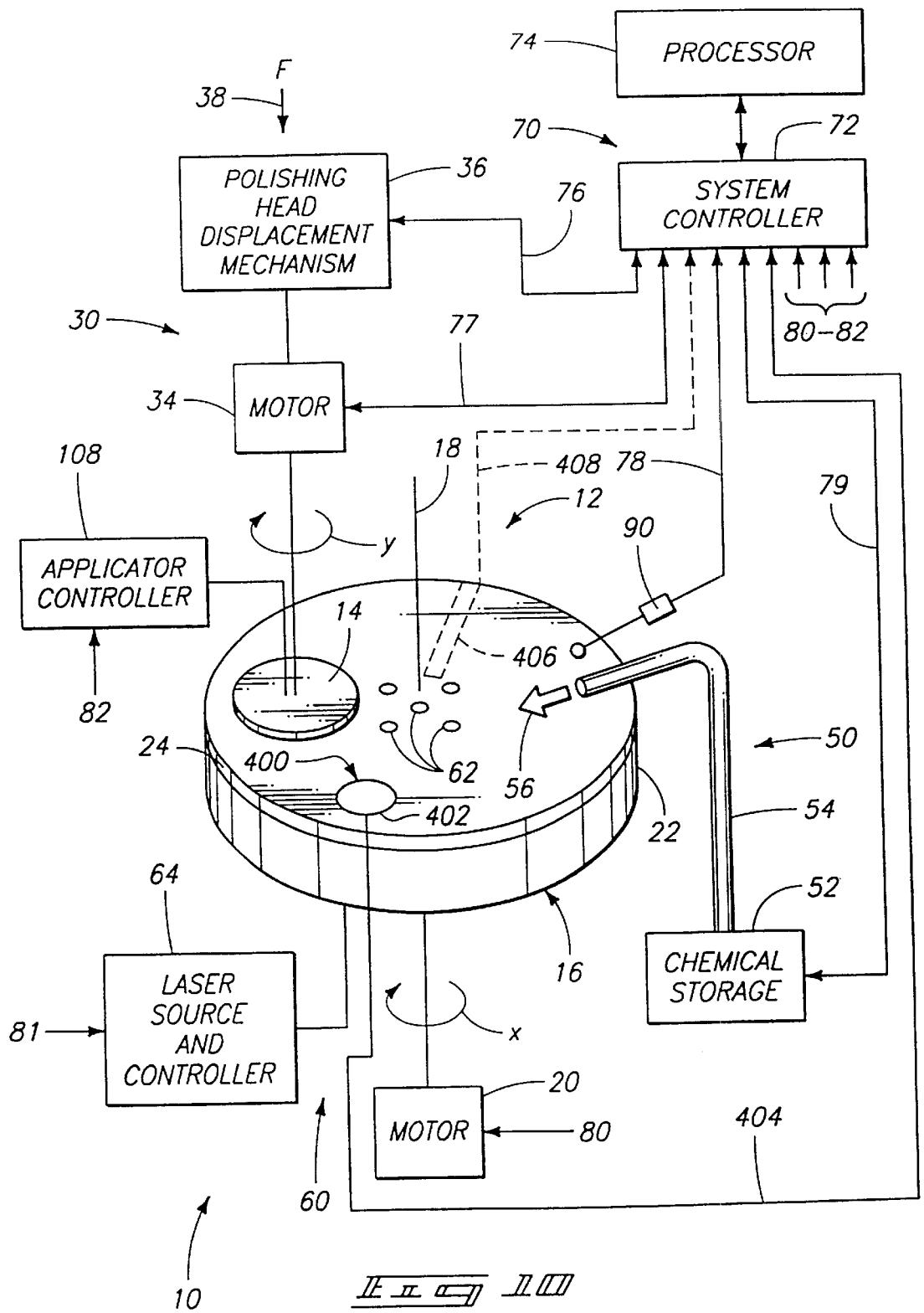
FIG. 10 is a diagrammatic perspective view of a polishing system including another alternative end point detector.

In another alternative embodiment, shown in FIG. 10, the system 10 comprises an end point detector (or end point detection means) 400 comprising means for detecting temperatures of different areas of the wafer using an infrared camera during polishing to develop an infrared image of the wafer. Such infrared mapping is disclosed in U.S. Pat. No. 5,196,353, issued to Sandhu et al., assigned to the assignee of the present invention, and incorporated herein by reference.

More particularly, in the illustrated embodiment, the means for detecting temperatures of different areas of the wafer comprises an infrared camera 402 connected to the controller 72 (and thus to the processor 74) via line 404. The infrared camera 402 may be mounted to the platen 22. In the illustrated embodiment, the operative portion (lens or window) of the infrared camera 402 is generally flush with, or slightly below, the top surface of the polishing pad 24 and faces the wafer. During polishing, the wafer is periodically moved by the polishing head displacement mechanism 36 over the camera 402. The camera 402 is of a type which contains an array or matrix of cells and is capable of mapping temperatures at different locations, and hence at different locations of the wafer.

In an alternative embodiment, a camera 406 (shown with dashed lines) is provided instead of the camera 402, and is connected to the controller 72 (and thus to the processor 74) via line 408. The camera 406 includes a lens or operative portion extending radially outwardly from the center of the platen subassembly to the periphery of the platen subassembly. In this manner, the wafer is continuously scanned during polishing.

With either camera arrangement, infrared waves emitted from the wafer are detected, and this information is correlated by the camera to the heat of various locations on the wafer. The infrared camera can either continuously (e.g., video), or periodically (e.g., photograph) take an image of the wafer.

During polishing of a wafer, process heat is developed as a result of friction. The temperature of the wafer surface is largely dependent on frictional force. Because different layers of the semiconductor material are formed of different materials (e.g., metallic films, polysilicon films, insulators) which have different relative hardnesses, the coefficient of friction and thus the temperature of the wafer will change in response to contact with a different layer. For example, integrated circuit devices on the wafer are generally harder than the oxide coating on the integrated circuit devices. In addition to use in developing a thermal image of the wafer developed during the polishing process, such temperature differentials are used to detect planar end points on the wafer. More particularly, the camera is connected to the controller 72, and the processor 74 determines when a planar end point has been reached in response to an expected temperature differential.

For example, the coefficient of friction between the wafer and the polishing pad 24, and thus the infrared image of the wafer, may be generally constant until the oxide of the wafer is polished away to a point where the surface of integrated circuits is exposed. At this time, the integrated circuits will contact the surface of the polishing pad. Because the integrated circuits are typically formed of harder material than the oxide coating, a different coefficient of friction occurs, and temperature rises. This rise in temperature is detected by the infrared camera and is used to control the operational parameters of the system 10. Such a rise in temperature may occur at a particular location on the wafer where oxide is more thoroughly removed than other areas. The pressure applicators can then be controlled to deform the wafer so that oxide is also removed from the rest of the wafer. Other operational parameters can also be adjusted based on the information provided by the infrared camera.

Figure 11:
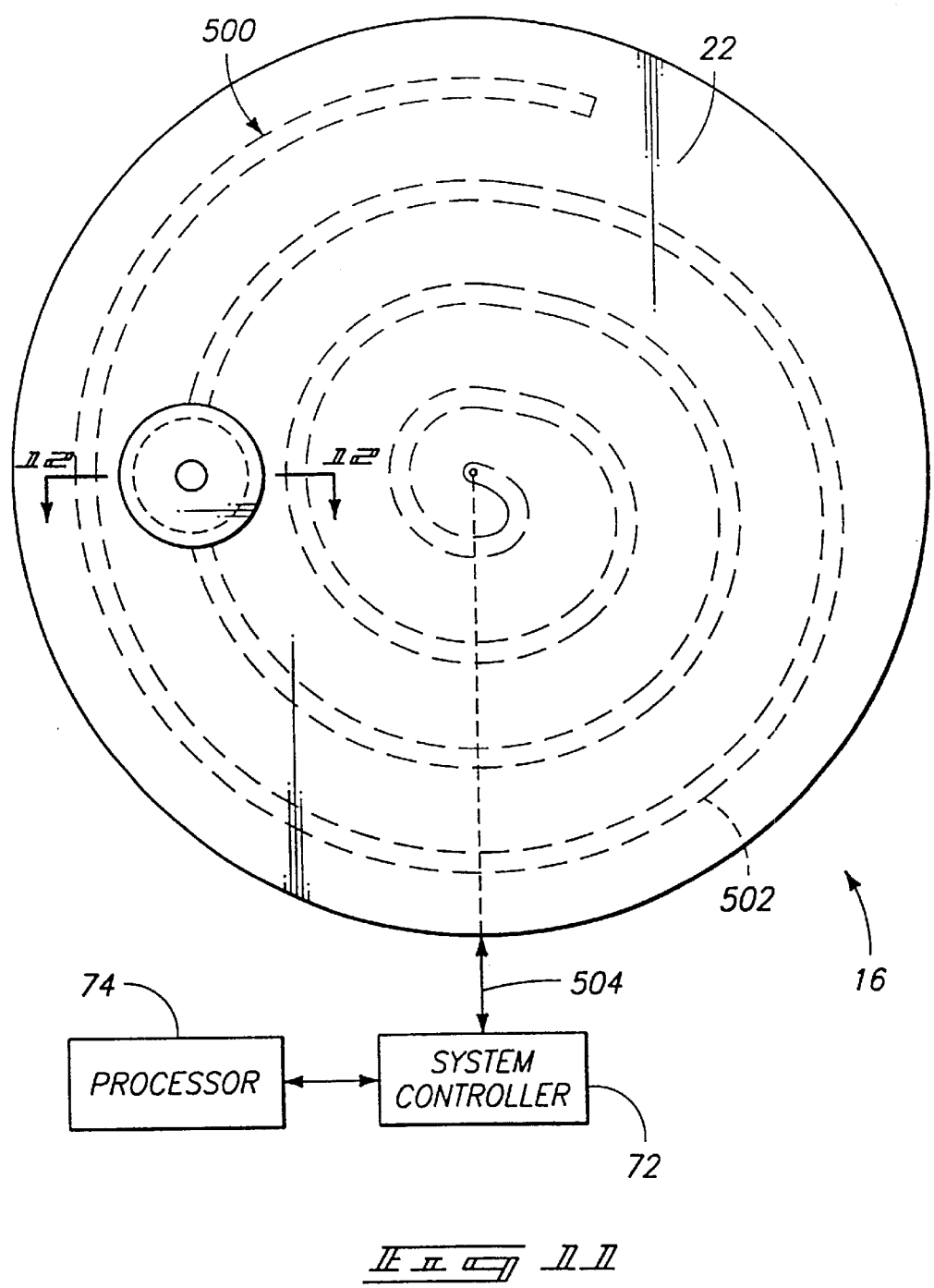
FIG. 11 is a diagrammatic top view of a polishing head and platen subassembly according to another aspect of this invention.

In another alternative embodiment, shown in FIG. 11, the system 10 further comprises means 500 for heating the wafer while the wafer face is being polished. More particularly, the heating means 500 is controllably adjustable while the wafer is being polished, so that wafer temperature becomes another of the adjustable operational parameters.

In the embodiment shown in FIG. 11, the heating means 500 comprises a heater or means for heating the platen subassembly 16 while the wafer is being polished. More particularly, the heating means 500 comprises a heating filament 502 supported by the platen subassembly 16 in the illustrated embodiment. In the illustrated embodiment, the heating filament 502 is an element that evenly heats the platen, and that is located in the platen just below the pad 24. Appropriate connectors permit electrical connection to the filament 502, for energization of the filament, while allowing rotation of the filament 502 with the platen. For example, circumferential connectors can be provided on the shaft that rotates the platen 22, and electrical contact can be made using brushes. The heating filament 502 is connected to the system controller 72 (and therefore to the processor 74) via a connector 504. In alternative embodiments, controllably heated liquid (described below in greater detail) or gas is introduced to the interior or exterior of the platen to controllably heat the platen.

Figure 12:
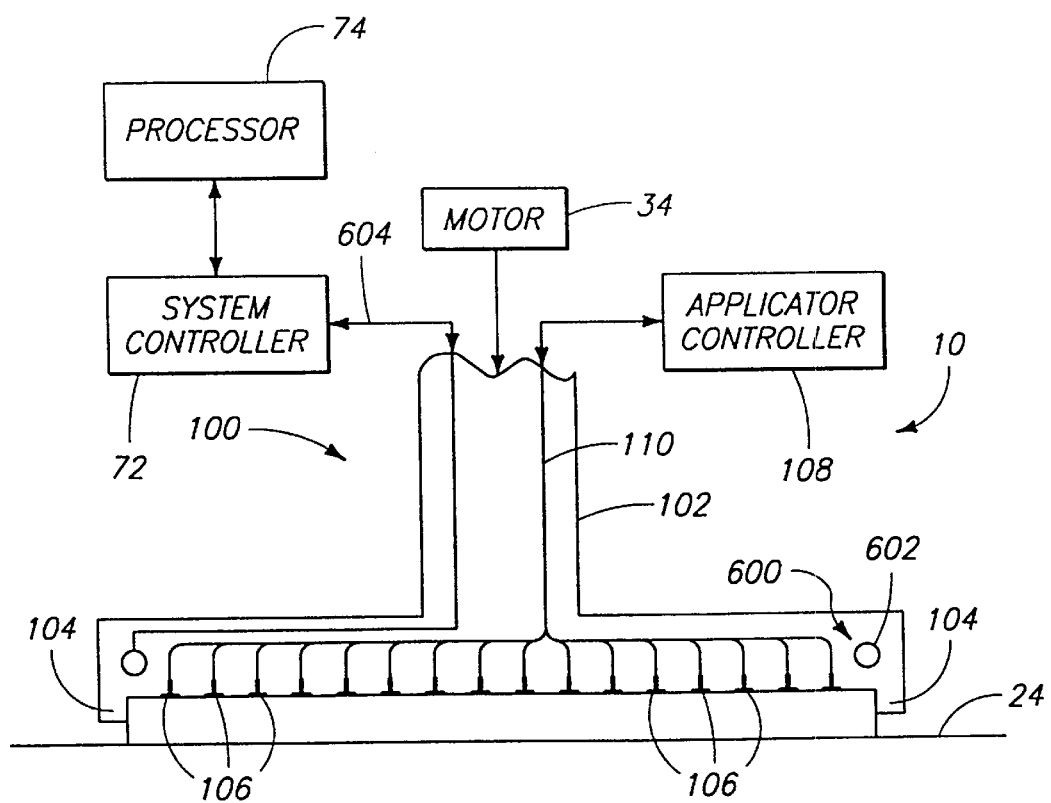
FIG. 12 is a diagrammatic sectional view of a polishing head taken along line 12—12 of FIG. 11.

In another alternative embodiment, shown in FIG. 12, the system 10 further comprises a heater or means 600 for heating the wafer while the wafer face is being polished, in the form of means for heating the polishing head 32 while the wafer is being polished. More particularly, the heating means 600 comprises a heating filament 602 supported by the polishing head 100 in the illustrated embodiment. In the illustrated embodiment, the heating filament 602 is annular or arcuate. However, other alternative heating filament shapes can be employed. Appropriate connectors permit electrical connection to the filament 602, for energization of the filament, while allowing rotation of the filament 602 with the polishing head 100. For example, circumferential connectors can be provided on the shaft that rotates the polishing head 100, and electrical contact can be made using brushes. In alternative embodiments, controllably heated fluid (liquid or gas) is introduced to the interior or exterior of the polishing head to heat the polishing head. The heating filament 602 is connected to the system controller 72 (and therefore to the processor 74) via a connector 604.

In another alternative embodiment, shown in FIGS. 13–14, the system 10 further comprises a temperature conditioning apparatus 700 for heating or cooling the wafer while the wafer face is being polished, in the form of a cooler or heater 704 for cooling or heating the platen subassembly 16 while the wafer is being polished. More particularly, platen subassembly 16 comprises a platen 22 having a hollow interior 702 (or a fluid passage in its interior), and the means for cooling or heating the platen subassembly 16 comprises means for flowing fluid through the hollow interior 702 and for controlling the temperature of the fluid. In the illustrated embodiment, where the temperature controlling unit 708 is a heater, the fluid is a liquid; however, in alternative embodiments, the fluid is a gas. In the embodiment shown in FIG. 14, the means for flowing fluid and for controlling the temperature of the fluid comprises the hollow interior or fluid passage 702, a pump 706 in fluid communication with the hollow interior or fluid passage 702 and conducting fluid through the hollow interior, and a temperature conditioning unit 708 cooling or heating the fluid. The pump 706 and the temperature conditioning unit 708 are connected to the controller 72, and thus to the processor 74.

In the illustrated embodiment, the fluid is a liquid, and the system 10 further includes, as appropriate, a sump or collection area 710 which may be generally annular, a conduit 711 directing collected liquid to the pump 706, nozzles 712 directed at the hollow interior or fluid passage 702; and conduits 714 from the pump 706 to the nozzles 712. Bearings may be provided where appropriate. The temperature conditioning apparatus 708 can cool or heat fluid either before or after it passes through the pump 706. In an embodiment where the fluid is a gas, the temperature conditioning apparatus 708, nozzles 712, sump 710, and conduit 711 can be replaced with a blower unit which selectively forces heated air at a controllable rate and/or controllable temperature toward the hollow interior or fluid passage 702.

The platen subassembly 16 includes any appropriate mounting structure 716 with which the platen subassembly 16 is supported for rotation with a spindle 718 driven by the motor 20. For example, the is platen subassembly 16 can be threaded, friction fit, welded, or otherwise secured to the spindle 718 or other support structure.

In alternative embodiments, the platen subassembly 16 is supported such that the hollow interior 702 is in direct contact with a pool of liquid, which pool of liquid is selectively heated or cooled by temperature conditioning apparatus 708.

In another alternative embodiment, shown in FIG. 15, the system 10 comprises a heater or means 800 for heating the wafer while the wafer face is being polished, in the form of a heater or means 802 for heating the platen subassembly 16 while the wafer is being polished. In the embodiment shown in FIG. 15, the platen subassembly 16 comprises a platen 22 having a fluid passage 804 in its interior, and the means for heating the platen subassembly 16 comprises means for flowing fluid through the fluid passage 804 and for controllably heating the temperature of the fluid. In the illustrated embodiment, the platen subassembly 16 is supported for rotation by a rotatable spindle 818 having a hollow interior 820, and fluid is introduced into the fluid passage 804 via the hollow interior 820 of the spindle 818. Optionally, a tube 822 is provided in the hollow interior 820, and the spindle 818 rotates about the tube 822. In the illustrated embodiment, the fluid is a liquid; however, in alternative embodiments, the fluid is a gas. In the embodiment shown in FIG. 15, the means for flowing fluid and for controllably heating the temperature of the fluid comprises the fluid passage 804, the tube 822 or hollow 820 in fluid communication with the fluid passage 804, a pump 806 in fluid communication with the fluid passage 804 or hollow 820, and a heating element 808 heating the fluid. The pump 806 and the heating element 808 are connected to the controller 72, and thus to the processor 74.

In the illustrated embodiment, the fluid is a liquid, and the system 10 further includes, as appropriate, a sump or collection area 810, a conduit 812 directing collected liquid to the pump 806, and bearings, as appropriate. The heating element 820 can heat fluid either before or after it passes through the pump 806. In an embodiment where the fluid is a gas, the heating element 808, sump 810, and conduits 812 can be replaced with a blower unit in fluid communication with the hollow 820 or tube 822.

In another alternative embodiment, shown in FIG. 16, the system 10 comprises a heater or means 900 for heating the wafer while the wafer face is being polished, in the form of means for changing the composition of the slurry delivered by the slurry supply system 50. More particularly, in the embodiment shown in FIG. 16, the slurry supply system 50 comprises multiple chemical storage areas 902, 904, 906, etc., which contain slurries of different compositions, and a controllable storage selector 908 which supplies a slurry of a selected composition to the conduit 54. The storage selector 908 is connected to the system controller 72, and thus to the processor 74, via a line 910. Because the different slurries contained in the chemical storage areas 902, 904, 906, etc. have different compositions, changing the chemical slurry results in a change in friction between the wafer and the polishing pad, and therefore in a change in temperature of the wafer while the wafer is being polished.

In another alternative embodiment, shown in FIG. 17, the system 10 comprises a heater or means 1000 for heating the wafer while the wafer face is being polished, in the form of means for heating the slurry before it is supplied to the wafer. More particularly, in the embodiment shown in FIG. 17, the system 10 comprises a heater 1002 which heats the slurry from the chemical storage 52 before it is supplied to the wafer, to heat the wafer. The heater 1002 is connected to the system controller 72, and thus to the processor 74, via a line 1004.

In yet another alternative embodiment (FIG. 1), the system 10 comprises heating means for controllably heating the wafer as it is being polished in the form of means for adjusting the force between the polishing head and the platen subassembly. More particularly, if the processor 74 determines that the temperature of the wafer should be changed, it instructs the system controller 72 to act on the polishing head displacement mechanism 36 to adjust the force between the wafer and the polishing pad 24. The change in force results in a change of friction between the wafer and the polishing pad, which in turn results in a change in temperature of the wafer while the wafer is being polished.

Any of the embodiments shown in FIGS. 11–17 can be advantageously combined with the embodiment shown in FIG. 10. Other combinations of any of the components of the alternative embodiments are also contemplated.

System 10 is therefore a fully automatic, computer driven apparatus that can polish a wafer, monitor results in situ, and make appropriate modifications in a real-time manner without any human intervention. The invention is advantageous over prior art polishing apparatus because it largely reduces the number of pre- and post-polishing measurements and significantly enhances throughput. The system enhances both efficiency and quality.

In compliance with the statute, the invention has been described in language necessarily limited in its ability to properly convey the conceptual nature of the invention. Because of this inherent limitation of language, it must be understood that the invention is not necessarily limited to the specific features shown and described, since the means and methods herein disclosed comprise merely preferred forms of putting the invention into effect. The invention is, therefore, claimed in any of its forms or modifications within the proper scope of the appended claims appropriately interpreted in accordance with the doctrine of equivalents.

What is claimed is:

1. A method of planarizing a substrate, comprising:
biasing a polishing pad and the substrate against each other;
sensing a change in an operating parameter associated with the polishing pad and the substrate at a substrate/pad contact point; and
changing a bias between the polishing pad and the substrate at the substrate/pad contact point in response to sensing, wherein sensing a change in an operating parameter comprises sensing a change at each of a plurality of areas of the substrate and wherein biasing a polishing pad and the substrate against each other comprises generating friction across the substrate at least in part by biasing the substrate and a polishing surface against each other using a plurality of force-exerting applicators.

2. The method of claim 1, wherein:

sensing a change in an operating parameter comprises sensing an increase in pressure; and changing a bias comprises increasing the bias.

3. The method of claim 2, wherein increasing the bias comprises increasing the bias along a circumference of the substrate, the circumference intersecting the substrate/pad contact point.

4. The method of claim 2, wherein increasing the bias comprises exerting pressure on the pad through the substrate.

5. The method of claim 1, wherein sensing a change in an operating parameter comprises sensing a change in a parameter chosen from a group consisting of: pressure and temperature.

6. A method of planarizing a semiconductor substrate, comprising:

biasing a polishing pad and the semiconductor substrate against each other;

sensing a change in an operating parameter associated with the polishing pad and the semiconductor substrate at a semiconductor substrate/pad contact point; and changing a bias between the polishing pad and the semiconductor substrate at the semiconductor substrate/pad contact point in response to sensing, wherein sensing a change in an operating parameter comprises sensing a change at each of a plurality of areas of the semiconductor substrate and wherein biasing a polishing pad and the semiconductor substrate against each other comprises generating friction across the semiconductor substrate at least in part by biasing the semiconductor substrate and a polishing surface against each other using a plurality of force-exerting applicators.

7. The method of claim 6, wherein:

sensing a change in an operating parameter comprises sensing an increase in pressure; and changing a bias comprises increasing the bias.

8. The method of claim 7, wherein increasing the bias comprises increasing the bias along a circumference of the semiconductor substrate, the circumference intersecting the semiconductor substrate/pad contact point.

9. The method of claim 7, wherein increasing the bias comprises exerting pressure on the pad through the semiconductor substrate.

10. The method of claim 6, wherein sensing a change in an operating parameter comprises sensing a change in a parameter chosen from a group consisting of: pressure and temperature.

11. A method of planarizing a substrate, comprising:

biasing a polishing pad and the substrate against each other;

sensing a change in an operating parameter associated with the polishing pad and the substrate at a substrate/pad contact point; and changing a bias between the polishing pad and the substrate at the substrate/pad contact point in response to sensing, wherein sensing a change in an operating parameter comprises sensing a change at each of a plurality of areas of the substrate, and wherein biasing a polishing pad and the substrate against each other comprises generating friction across the substrate at least in part by biasing the substrate and a polishing surface against each other using a plurality of force-exerting applicators.

12. The method of claim 11, wherein:

sensing a change in an operating parameter comprises sensing an increase in pressure; and changing a bias comprises increasing the bias.

13. The method of claim 12, wherein increasing the bias comprises increasing the bias along a circumference of the substrate, the circumference intersecting the substrate/pad contact point.

14. The method of claim 12, wherein increasing the bias comprises exerting pressure on the pad through the substrate.

15. The method of claim 11, wherein sensing a change in an operating parameter comprises sensing a change in a parameter chosen from a group consisting of: pressure and temperature.

16. A method of planarizing a semiconductor substrate, comprising:

biasing a polishing pad and the semiconductor substrate against each other;

sensing a change in an operating parameter associated with the polishing pad and the semiconductor substrate at a semiconductor substrate/pad contact point; and changing a bias between the polishing pad and the semiconductor substrate at the semiconductor substrate/pad contact point in response to sensing, wherein sensing a change in an operating parameter comprises sensing a change at each of a plurality of areas of the semiconductor substrate, and wherein biasing a polishing pad and the semiconductor substrate against each other comprises generating friction across the semiconductor substrate at least in part by biasing the semiconductor substrate and a polishing surface against each other using a plurality of force-exerting applicators.

17. The method of claim 16, wherein:

sensing a change in an operating parameter comprises sensing an increase in pressure; and changing a bias comprises increasing the bias.

18. The method of claim 17, wherein increasing the bias comprises increasing the bias along a circumference of the semiconductor substrate, the circumference intersecting the semiconductor substrate/pad contact point.

19. The method of claim 17, wherein increasing the bias comprises exerting pressure on the pad through the semiconductor substrate.

20. The method of claim 16, wherein sensing a change in an operating parameter comprises sensing a change in a parameter chosen from a group consisting of: pressure and temperature.

* * * * *

UNITED STATES PATENT AND TRADEMARK OFFICE
CERTIFICATE OF CORRECTION

PATENT NO. : 6,488,566 B2
DATED : December 3, 2002
INVENTOR(S) : Gurtej S. Sandhu et al.

It is certified that error appears in the above-identified patent and that said Letters Patent is hereby corrected as shown below:

Column 2,
Line 17, replace "high and low If areas, whereby the high areas will be" with
-- high and low areas, whereby the high areas will be --

Column 6,
Line 32, replace "on the wafer caused by the individually is controllable" with
-- on the wafer caused by the individually controllable --

Column 7,
Line 4, replace "e signals that operatively position the" with -- electric signals that operatively position the --

Column 13,
Line 13, replace "motor 20. For example, the is platen subassembly 16 can be" with
-- motor 20. For example, the platen subassembly 16 can be --

Signed and Sealed this

Twelfth Day of August, 2003

JAMES E. ROGAN
*Director of the United States Patent and Trademark Office*